W. H. OAKES.
SPARE WHEEL LOCK.
APPLICATION FILED AUG. 8, 1921.
1,430,837.
Patented Oct. 3, 1922.
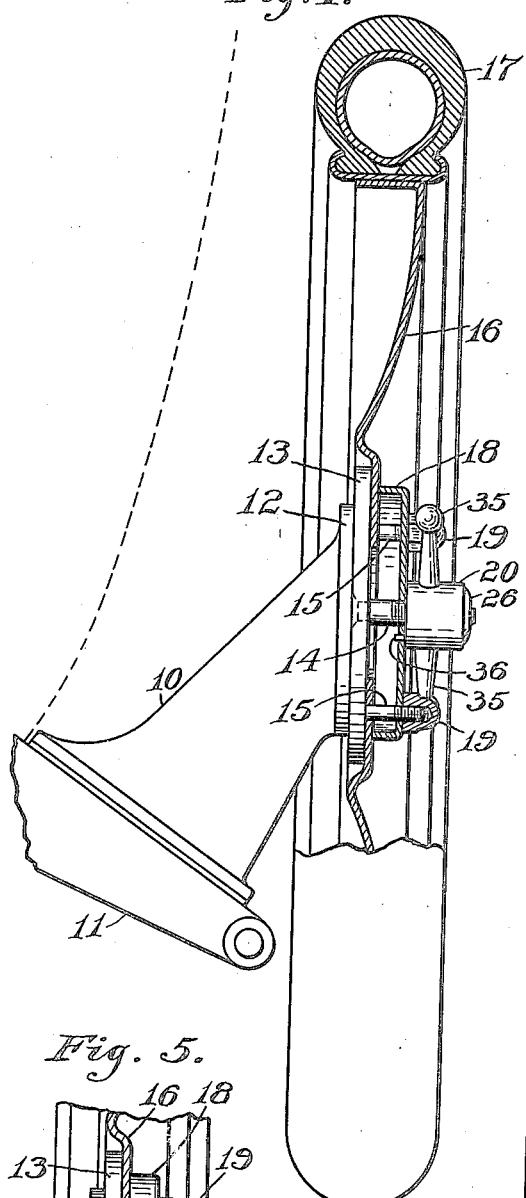
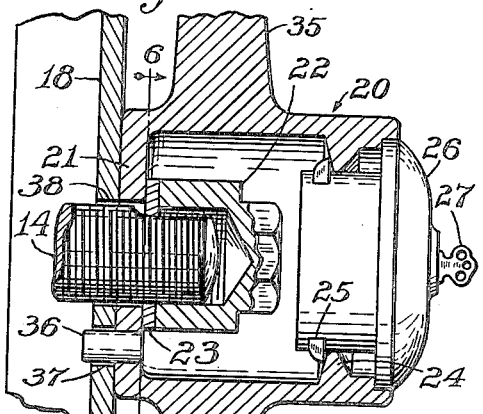
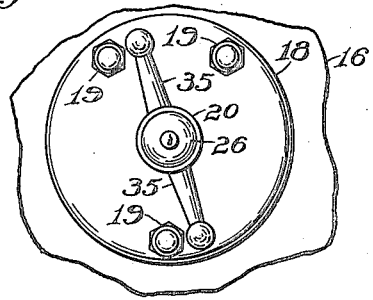
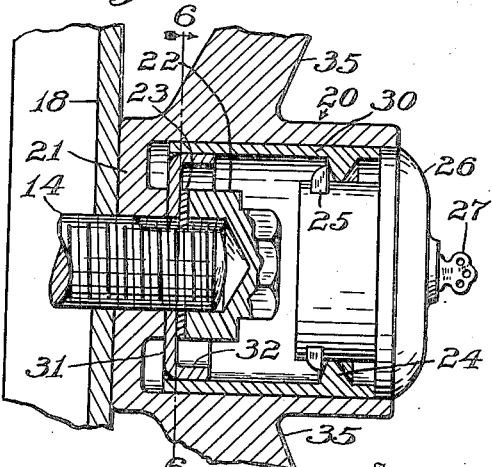
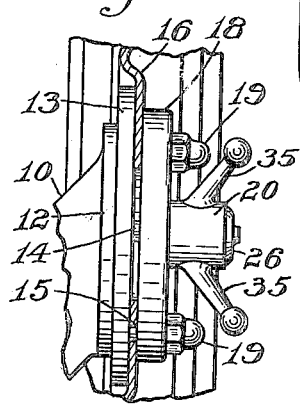
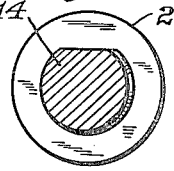
Inventor
William H. Oakes,
By Hood & Schley
Attorneys Patented Oct. 3, 1922.                                                    1,430,837

UNITED STATES PATENT OFFICE.

WILLIAM H. OAKES, OF INDIANAPOLIS, INDIANA, ASSIGNOR TO THE OAKES COMPANY, OF INDIANAPOLIS, INDIANA, A CORPORATION OF INDIANA.

SPARE-WHEEL LOCK.

Application filed August 8, 1921. Serial No. 490,510.

*To all whom it may concern:*

Be it known that I, WILLIAM H. OAKES, a citizen of the United States, residing at Indianapolis, in the county of Marion and State of Indiana, have invented a new and useful Spare-Wheel Lock, of which the following is a specification.

It is the object of my invention to provide a simple and effective lock, in which the locking nut is entirely enclosed and is inaccessible, principally for locking spare wheels in place.

The accompanying drawing illustrates my invention: Fig. 1 is a side elevation, in partial section, of the spare-wheel support of an automobile, with a spare disk-wheel locked in place thereon in accordance with one form of my invention; Fig. 2 is an enlarged central section through the locking device, showing only a fragment of the clamping plate, and having the arms of the lock housing or box broken away; Fig. 3 is a fragmentary front elevation of the locking device, showing only a portion of the disk wheel; Fig. 4 is a view similar to Fig. 2, showing another form of my invention; Fig. 5 is a view similar to the central part of Fig. 1, showing the interrelation of the parts in that form of my invention shown in Fig. 4; and Fig. 6 is a section on the line 6—6 of either Fig. 2 or Fig. 4, showing the non-rotatable mounting of the washer.

A spare-wheel carrier 10 is suitably supported on the rear end 11 of the automobile or its frame in any suitable way, and at its free end terminates in a disk-shaped plate 12, to which is suitably attached, by bolts or otherwise, a carrier plate 13. A central lock-bolt 14 projects rearward from the plates 12 and 13, and is suitably fastened to one or both of such plates—usually being riveted to the carrier plate 13. The carrier plate 13 also has several wheel-carrying bolts 15 radially spaced from the central bolt 14 and suitably spaced with relation to each other so that they will fit into the hub-holes in the disk 16 of the spare disk wheel, which at its outer edge is provided with the usual tire 17. As shown, there are three bolts 15, which is sufficient. A flanged circular clamping plate 18 also fits upon the bolts 14 and 15, and clamps the central part of the disk wheel 16 against the carrier plate 13, by the action of acorn nuts 19 on the bolts 15. So far, this is a customary way of mounting a spare disk wheel on a spare-wheel carrier.

A hollow lock-nut-enclosing box 20 is mounted on the projecting end of the lock bolt 14. This box, which is conveniently cylindrical, has at its inner end an inwardly extending flange 21 for bearing against the clamping plate 18; and at its outer end is open to permit the insertion of a locking nut 22 and of a socket wrench for turning such locking nut upon the lock bolt 14, upon which it fits, the locking nut 22 conveniently having an ensmalled closed hexagonal end for receiving such socket wrench. The locking nut 22 clamps against the flange 21, preferably with the interposition of one or more washers 23 suitably held from turning on the lock bolt 14, by conveniently having interengaging rotation-preventing portions, such as flattened portions on the outside of such bolt and the inside of such washer, as is clear from Fig. 6. The box 20 has an inwardly extending annular flange 24 near its open end, which flange cooperates with the retractible bolts 25 of a suitable circular locking member 26 which fits into the open end of the box 20 and is locked in place therein by the cooperation of the retractible bolts 25 with the flange 24. The bolts 25 are retractible by a key 27, to permit the removal of the member 26; but are shaped so that the member 26 may be snapped into place without manipulating the key 27. When the member 26 is in place, it may be freely turned about its axis, the bolts 25 sliding on the face of the flange 24; and it is so shaped that it is substantially impossible for a jimmy or other tool to be inserted between the member 26 and the box 20.

The box 20 is frequently made of some soft metal, as of aluminum, for ornamental purposes. In order to minimize the possibility of sawing through such box, especially when it is of soft metal, I prefer to provide a hardened steel inner box, as indicated in Fig. 4. When this inner box is provided, it conveniently consists of a cylindrical stamping 30, which has a press fit within the box 20, and an inner-end disk-shaped stamping 31 which has a peripheral flange 32 spot-welded in place in the end of the cylindrical member 30, the disk-shaped member 31 being perforated centrally to permit the passage of the bolt 14, and bearing against the flange 21, of which it is essentially a part. When this inner box is used, the locking nut 22, preferably with the interposition of the washer 23, acts against the inner-end member 31, and the inwardly projecting flange 24 is made as part of the cylindrical member 30. In consequence, this inner box of hardened steel, with the circular locking member 26, constitute a complete enclosure for the locking nut 22, regardless of the outer box 20, so that even though the outer box is completely destroyed access to the locking nut 22 is not obtained.

The possibility of frictionally turning the locking nut 22 by rotation of the box 20, as by turning such box by the oppositely projecting radial arms 35 with which it is usually provided, largely for the sake of appearance, is prevented by the washer 23, which cannot turn on the lock-bolt 14. While this is ordinarily sufficient, I preferably supplement it by one or more other devices, especially as the washer 23 may be lost when wheels are changed. First, I may arrange the arms 35 so that they lie so close to the clamping plate 18 that they will not pass the acorn nuts 19 or the ends of the bolts 15, as is indicated in Figs. 1 and 3. Second, I may provide the flange 21 with an eccentric pin 36 which projects through a similarly eccentric hole 37 provided in the clamping plate 18, as indicated in Figs. 1 and 2. If desired, both the eccentric pin 36 and the arms 35 which interlock with the acorn nuts 19 may be used. With either of these arrangements the flange 21 is provided with a central un-threaded hole 38 which slips freely over the lock bolt 14, as is indicated in Fig. 2. Instead of providing either the eccentric pin 36 or the interlocking of the arms 35 with the acorn nuts 19, I may provide the flange 21 with internal threads which mesh with the threads on the lock bolt 14, as is indicated in Fig. 4, the arms 35 in such case being made oblique to clear the acorn nuts 19, as is clear from Fig. 5: with this arrangement, the box 20 is screwed on to the lock bolt 14, and acts as a primary clamping nut to force the clamping plate 18 against the central part of the disk 16; and when the desired clamping has been obtained in this manner, the locking nut 22 is screwed on to the end of the lock bolt 14 tight against the flange 21 or member 31, usually with the washer 23 interposed, thus producing a lock-nut action which even with such washer omitted effectively prevents the box 20 from being turned. With any of these arrangements for preventing turning of the box 20 and thereby turning off the locking nut 22, or any combination of them, such locking nut 22 is locked against access when the locking member 26 is in place, and is rendered accessible for a socket wrench when such locking member is removed.

I claim as my invention:

1. In combination, a spare wheel support having a projecting bolt, a clamping plate for clamping a spare wheel upon said support, bolts and nuts for clamping such clamping plate in position, a box removably mounted upon said first-named bolt, a nut removably mounted on said first-named bolt within said box for holding it and the clamping plate in place, and a locking member for closing said box and rendering inaccessible the nut within it, said box being provided with laterally extending arms which interlock with said second-named bolts and nuts to prevent turning of said box.

2. In combination, a spare wheel support having a projecting bolt, a clamping plate for clamping a spare wheel upon said support, a box removably mounted upon said bolt, a nut removably mounted on said bolt within said box for holding it and the clamping plate in place, and a locking member for closing said box and rendering inaccessible the nut within it, said box having a screw-mounting on said bolt, and said locking nut having a lock-nut action on said box.

3. In combination, a spare wheel support having a projecting bolt, a clamping plate for clamping a spare wheel upon said support, a box removably mounted upon said bolt, a nut removably mounted on said bolt within said box for holding it and the clamping plate in place, and a locking member for closing said box and rendering inaccessible the nut within it, said locking member being freely rotatable when in locking position.

4. In combination, a spare wheel support having a projecting bolt, a clamping plate for clamping a spare wheel upon said support, a box removably mounted upon said bolt, a nut removably mounted on said bolt within said box for holding it and the clamping plate in place, and a locking member for closing said box and rendering inaccessible the nut within it, said box having a circular inwardly projecting flange, and said locking member being provided with retractible bolts for cooperating with said flange to normally prevent removal of said locking member but to permit said locking member to be turned while in locking position.

5. In combination, a spare wheel support having a projecting bolt, a clamping plate for clamping a spare wheel upon said support, a box removably mounted upon said bolt, a nut removably mounted on said bolt within said box for holding it and the clamping plate in place, and a locking member for closing said box and rendering inaccessible the nut within it, said box comprising an inner shell of hardened steel and an outer member in which said hardened steel member fits, said inner hardened-steel member and said removable locking member together forming a complete enclosure for said locking nut so that the latter is still inaccessible, even though the outer member of said box is destroyed.

6. In a locking device, the combination of a lock bolt, a box having a screw-threaded mounting on said lock bolt, a locking nut removably mounted on said lock bolt within said box, and a removable locking member which when in locking position closes said box and encloses said locking nut, said box comprising an inner shell of hardened steel and an outer member in which said hardened steel member fits.

7. In a locking device, the combination of a lock bolt, a box having a screw-threaded mounting on said lock bolt, a locking nut removably mounted on said lock bolt within said box, and a removable locking member which when in locking position closes said box and encloses said locking nut, said box comprising an inner shell of hardened steel and an outer member in which said hardened steel member fits, said inner hardened-steel member and said removable locking member together forming a complete enclosure for said locking nut so that the latter is still inaccessible even though the outer member of said box is destroyed.

8. In a locking device, the combination of a lock bolt, a box having a screw-threaded mounting on said lock bolt, a locking nut removably mounted on said lock bolt within said box, and a removable locking member which when in locking position closes said box and encloses said locking nut, said box comprising an inner shell of hardened steel and an outer member in which said hardened steer member fits, said inner hardened-steel member and said removable locking member together forming a complete enclosure for said locking nut so that the latter is still inaccessible even though the outer member of said box is destroyed, said locking member being freely rotatable in and being locked upon said inner shell when in locking position regardless of whether or not the outer member is present.

9. In a locking device, the combination of a lock bolt, a box having a screw-threaded mounting on said lock bolt, a locking nut removably mounted on said lock bolt within said box, and a removable locking member which when in locking position closes said box and encloses said locking nut, said box comprising an inner shell of hardened steel and an outer member in which said hardened steel member fits, said inner hardened-steel member and said removable locking member together forming a complete enclosure for said locking nut so that the latter is still inaccessible even though the outer member of said box is destroyed, said inner hardened-steel shell having a circular inwardly projecting flange, and said locking member being provided with retractible bolts for cooperating with said flange to normally prevent removal of said locking member but to permit said locking member to be turned while in locking position.

10. In combination, a spare wheel support having a projecting bolt, a clamping plate for clamping a spare wheel upon said support, a box removably mounted upon said bolt, a nut removably mounted on said bolt within said box for holding it and the clamping plate in place, a locking member for closing said box and rendering inaccessible the nut within it, and a washer on said bolt beneath said nut, said washer and said bolt interlocking to prevent rotation of the washer on the bolt.

In witness whereof, I have hereunto set my hand at Indianapolis, Indiana, this 1st day of July, A. D. one thousand nine hundred and twenty one.

WILLIAM H. OAKES.